(12) United States Patent
Hennig

(10) Patent No.: US 8,444,362 B2
(45) Date of Patent: May 21, 2013

(54) ROUND BALE MOVER

(76) Inventor: Emmett D. Hennig, Decatur, NE (US)

( * ) Notice: Subject to any disclaimer, the term of this patent is extended or adjusted under 35 U.S.C. 154(b) by 421 days.

(21) Appl. No.: 12/927,073

(22) Filed: Nov. 5, 2010

(65) Prior Publication Data
US 2012/0114450 A1 May 10, 2012

(51) Int. Cl.
*A01D 87/127* (2006.01)
*B65G 67/02* (2006.01)

(52) U.S. Cl.
USPC ............... 414/24.5; 414/911; 414/920

(58) Field of Classification Search
USPC ............ 414/111, 24.5, 24.6, 540, 546, 547, 414/551, 552, 555, 910, 911
See application file for complete search history.

(56) References Cited

U.S. PATENT DOCUMENTS

| | | | |
|---|---|---|---|
| 2,896,805 A | 7/1959 | Rigsby | |
| 3,800,966 A * | 4/1974 | Newton | 414/550 |
| 3,880,305 A * | 4/1975 | Van Polen | 414/24.5 |
| 3,934,726 A | 1/1976 | Martin | |
| 4,027,773 A * | 6/1977 | Kenworthy | 414/703 |
| 4,091,947 A | 5/1978 | Fischer | |
| 4,120,405 A | 10/1978 | Jones et al. | |
| 4,161,253 A * | 7/1979 | Ralston et al. | 414/24.6 |
| 4,395,189 A | 7/1983 | Munten | |
| 5,074,733 A | 12/1991 | Hennig | |
| 7,182,568 B2 | 2/2007 | McGinnes | |
| 7,753,636 B2 | 7/2010 | Hennig | |
| 2003/0123956 A1 | 7/2003 | Noualy | |
| 2009/0245976 A1* | 10/2009 | Hennig | 414/24.5 |
| 2010/0040436 A1* | 2/2010 | Bruha et al. | 414/24.5 |

FOREIGN PATENT DOCUMENTS

| | | | |
|---|---|---|---|
| DE | 4142613 A1 * | 6/1993 | |
| DE | 10127949 A1 * | 12/2002 | |
| GB | 2257415 A * | 1/1993 | |
| JP | 06296422 A * | 10/1994 | |
| WO | WO 8906499 A * | 7/1989 | |
| WO | WO 2010019581 A2 * | 2/2010 | |

OTHER PUBLICATIONS

3-Point round Bale Movers, Models 210F and 211F, one-page dealer flyer, Emmett Hennig Manufacturing, Decatur, NE.

* cited by examiner

*Primary Examiner* — Gregory Adams
(74) *Attorney, Agent, or Firm* — Dennis L. Thomte; Thomte Patent Law Office LLC

(57) ABSTRACT

A round bale mover for attachment to either a tractor mounted front-end loader or a tractor three-point hitch for moving a pair of round bales. First and second bale teeth extend from a first end of the bale mover for supporting a first bale thereon. Third and fourth bale teeth extend from a second end of the bale mover for supporting a second bale thereon. The first and second bale teeth are selectively movable towards and away from the third and fourth bale teeth. The third and fourth bale teeth are selectively movable towards and away from the first and second bale teeth. The bale mover enables the first and second bales to be moved towards one another and moved away from one another.

3 Claims, 7 Drawing Sheets

ROUND BALE MOVER

BACKGROUND OF THE INVENTION

1. Field of the Invention

This invention relates to a bale mover and more particularly to a bale mover which may be mounted on the three-point hitch of a tractor or on the forward end of a front-end loader mounted on the tractor. More particularly, the bale mover of this invention enables a pair of bales to be moved by the bale mover. Even more particularly, the instant invention relates to a bale mover which enables a pair of bales to be placed on the ground in a spaced-apart side-by-side relationship without tearing or damaging the plastic net wrap on the bales. Even more particularly, the instant invention relates to a bale mover which enables a pair of bales to be placed on a bale carrier, such as a truck or trailer, in a side-by-side manner with the bales being in engagement with one another.

2. Description of the Related Art

Many types of large, round bale handlers, movers or carriers have been previously provided. Some of the early bale movers utilized a bale spear or tooth which was operatively secured to the three-point pitch of a tractor or which was secured to the forward end of a front-end loader mounted on the tractor.

Assuming that the prior art bale tooth extended rearwardly from the tractor, the tractor operator would back up to a bale and drive the tooth into the bale. The tractor operator would then raise the three-point hitch of the tractor to raise the speared bale from the ground. The tractor operator would then drive to a remote location where the bale would be placed on the ground or stacked on other bales for subsequent storage, transport or consumption. As the size of farm tractors has grown, the bale movers have been modified to enable the bale movers to handle two large round bales in a spaced-apart side-by-side relationship.

In Applicant's U.S. Pat. No. 7,753,636, which issued on Jul. 13, 2010, a bale mover is disclosed which enabled a pair of round bales to be vertically movably supported on the forward end of a tractor mounted front-end loader and/or vertically movably supported by a three-point hitch at the rearward end of a tractor. U.S. Pat. No. 7,753,636 is hereby incorporated by reference to complete the disclosure herein if necessary.

However, it has been determined that most persons involved in the hay business desire that the bales be spaced-apart when stored on the ground so that rain or snow will not collect between the bales. A problem associated with the storage of the bales in a spaced-apart manner arises when the bales are to be transported on a bale carrier such as a truck or trailer. If the bales are moved in pairs, the spaced-apart bales, when placed on the bale carrier will have a greater width than if the bales were closely positioned together in an abutting side-by-side relationship.

SUMMARY OF THE INVENTION

A round bale mover is disclosed for attachment to either a vertically movable three-point hitch at the rearward end of a tractor or to the forward end of a front-end loader mounted on a tractor. The bale mover of this invention comprises an elongated, transversely and horizontally extending main frame which has first and second ends. An upstanding attachment frame is secured to the main frame between the ends thereof which is adapted to be operatively selectively secured to either the three-point hitch of a tractor or to the forward end of a front-end loader mounted on a tractor. The bale mover will be described hereinafter in the attitude in which it is mounted on the forward ends of the boom arms of a front-end loader mounted on a tractor.

A first upstanding post has its lower end secured to the first end of the main frame and extends upwardly therefrom. A second upstanding post has its lower end secured to the second end of the main frame and extends upwardly therefrom. First and second tubular supports are vertically slidably mounted on the first and second posts respectively which have a forward side, a rearward side, and inner and outer sides. The first and second tubular supports are movable between upper and lower positions with respect to the first and second posts respectively.

A first generally horizontally disposed support frame is secured to the first tubular support above the lower end thereof and which has an inner end positioned inwardly of the inner side of the first tubular support and an outer end positioned outwardly of the outer side of the first tubular support. An elongated link, having upper and lower ends, has its upper end pivotally secured, about a horizontal axis, to the outer end of the first support frame. An elongated second link, having upper and lower ends, has its upper end pivotally secured, about a horizontal axis, to the inner end of the first support frame. An elongated first linkage member, having inner and outer ends, has its outer end pivotally secured, about a horizontal axis, to the lower end of the first link. The inner end of the first linkage member is pivotally secured, about a horizontal axis, to the lower end of the second link.

A first elongated bale tooth is operatively secured to the first link which extends horizontally forwardly therefrom. A second elongated bale tooth is operatively secured to the second link which extends horizontally forwardly therefrom. A first hydraulic cylinder, having a base end and a rod end, is movable between retracted and extended positions and has its base end pivotally secured to the first tubular support above the first support frame. The rod end of the first hydraulic cylinder is pivotally secured to the first link. The retraction of the first hydraulic cylinder causes the first and second bale teeth to be moved laterally outwardly with respect to the main frame with the extension of the first hydraulic cylinder causing the first and second bale teeth to be moved laterally inwardly with respect to the main frame.

A second generally horizontally disposed support frame is secured to the second tubular support above the lower end thereof and which has an inner end positioned inwardly of the inner side of the second tubular support and an outer end positioned outwardly of the outer side of the second tubular support. A third link, having upper and lower ends, has its upper end pivotally secured, about a horizontal axis, to the inner end of the second support frame. A fourth link, having upper and lower ends, has its upper end pivotally secured, about a horizontal axis, to the outer end of the second support frame. An elongated second linkage member, having inner and outer ends, has its outer end pivotally secured, about a horizontal axis, to the lower end of the fourth link. The inner end of the second linkage member is pivotally secured, about a horizontal axis, to the lower end of the third link.

A third elongated bale tooth is operatively secured to the third link which extends horizontally forwardly therefrom. A fourth elongated bale tooth is operatively secured to the fourth link which extends horizontally forwardly therefrom. A second hydraulic cylinder, having a base end and a rod end, is movable between retracted and extended positions and has its base end pivotally secured to the second tubular support above the second support frame. The rod end of the second hydraulic cylinder is pivotally secured to the fourth link. The retraction of the second hydraulic cylinder causes the third and fourth bale teeth to be moved laterally outwardly with respect to the main frame with the extension of the second hydraulic cylinder causing the third and fourth bale teeth to be moved laterally inwardly with respect to the main frame.

In a first embodiment, first and second elongated tether members, having upper and lower ends, are provided with the upper end of the first tether member being secured to the first post adjacent the upper end thereof with the lower end of the first tether member being secured to the first tubular support to limit the downward movement of the first tubular support with respect to the first post. The upper end of the second tether member is secured to the second post adjacent the upper end thereof and the lower end of the second tether member is secured to the second tubular support to limit the downward movement of the second tubular support with respect to the second post. As described in U.S. Pat. No. 7,753,636, the effective length of one of the tether members is longer than the effective length of the other tether member so that the tubular support connected to the shorter tether member will be positioned in a plane above the outer tubular support so that the bale teeth secured to that tubular support will be in a plane above the bale teeth secured to the other tubular support.

The fact that the first and second bale teeth and the third and fourth bale teeth may be selectively pivotally moved toward one another and away from one another enables the bale mover to pick up a pair of spaced-apart bales and then move those bales towards one another so that they may be loaded onto a truck or trailer for transport.

In a second embodiment, the first and second tubular supports are slidably moved upwardly and downwardly on the first and second posts respectively by hydraulic cylinders. In a third embodiment, the first and second tubular supports are not utilized. In the third embodiment, the base ends of the first and second hydraulic cylinders are pivotally secured to the first and second posts respectively.

It is therefore a principal object of the invention to provide an improved bale mover.

It is a further object of the invention to provide an improved bale mover wherein the bale mover may pick up a pair of horizontally spaced-apart round bales and move the same towards one another so as to be in an abutting side-to-side relationship for positioning on a bale carrier such as a trailer or truck.

These and other objects will be apparent to those skilled in the art.

DESCRIPTION OF THE PREFERRED EMBODIMENT

Figure 1:
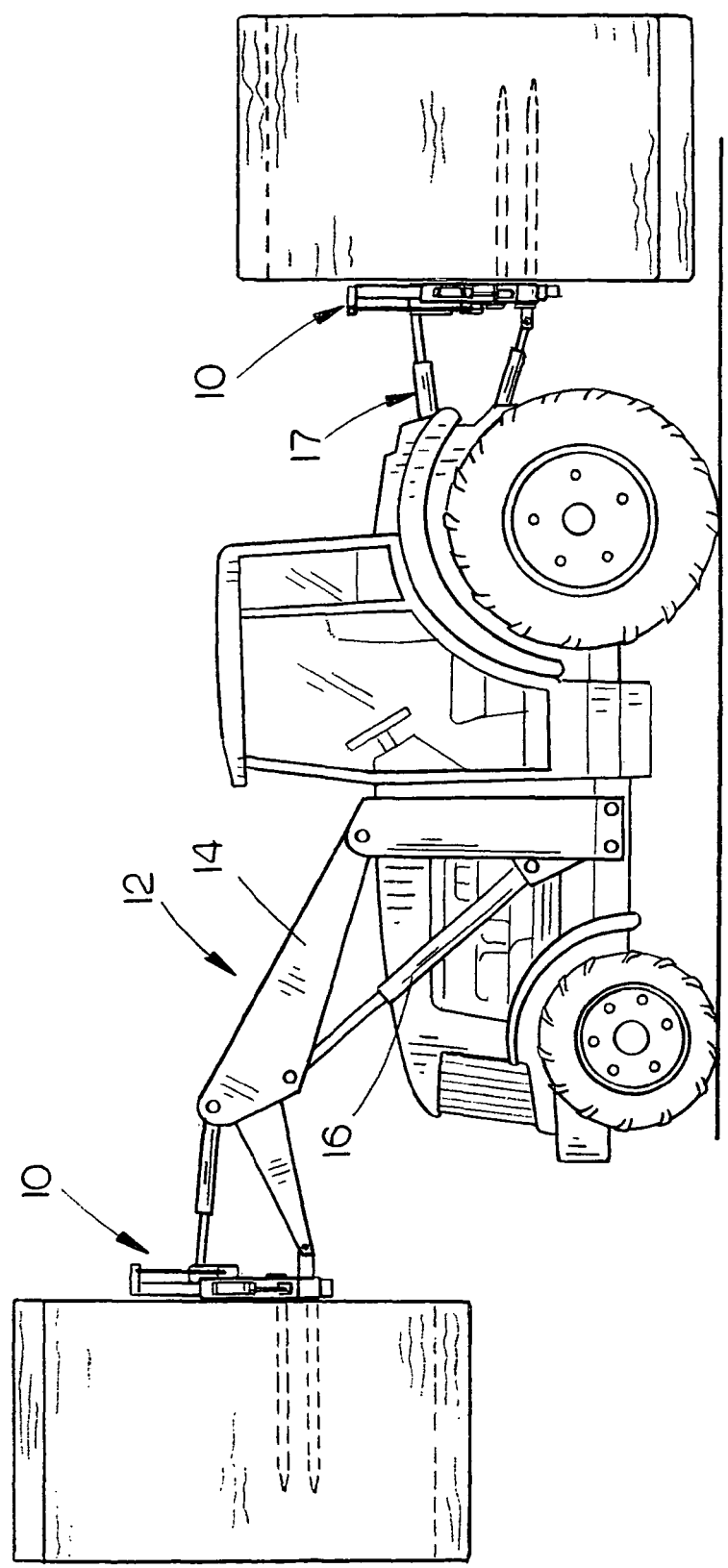
FIG. 1 is a side view illustrating the round bale mover of this invention mounted on the forward end of a tractor mounted front-end loader and also mounted on the rear end of a three-point hitch mounted on the tractor.
Figure 2:
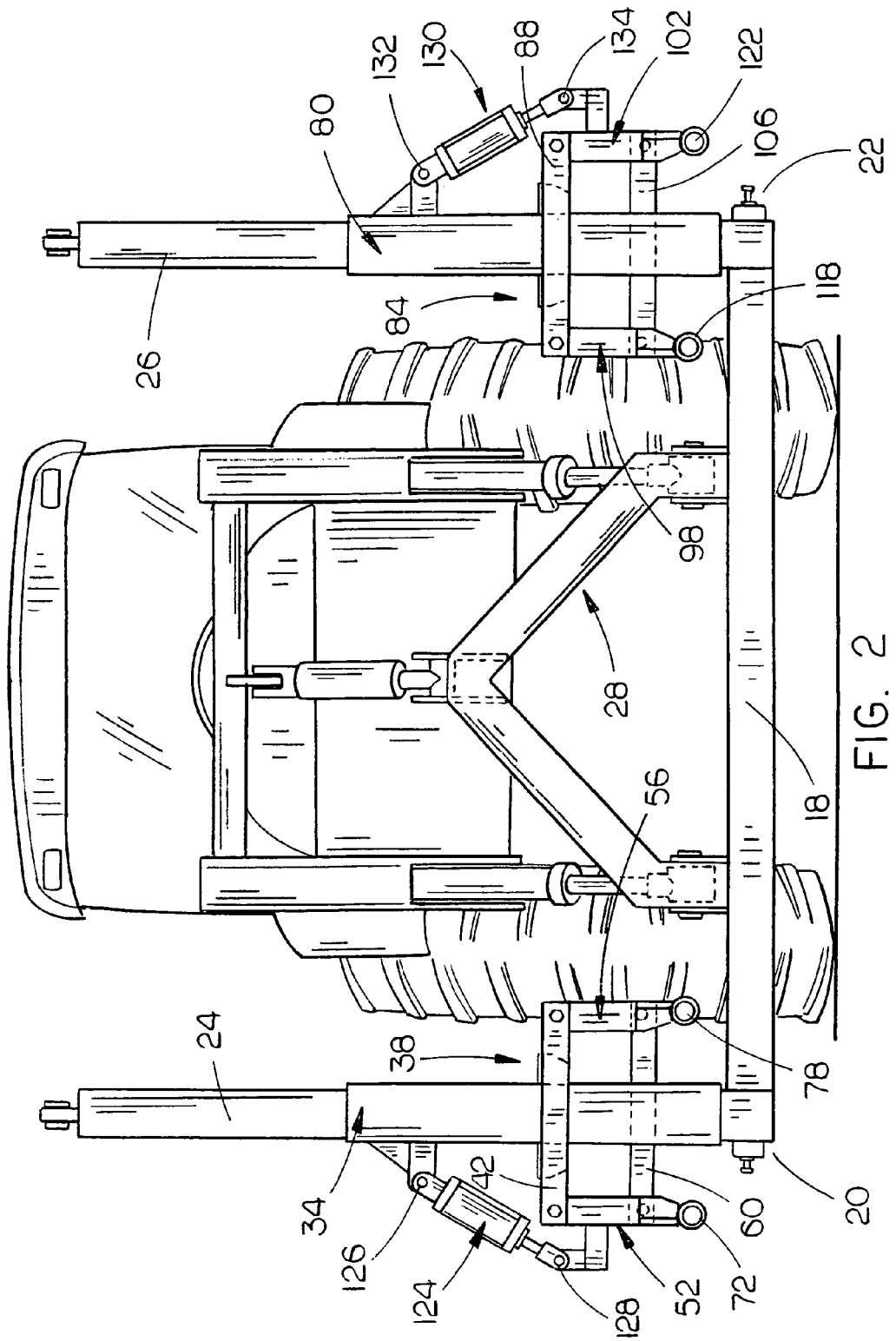
FIG. 2 is a front elevational view illustrating the bale mover of this invention mounted on the forward end of a front end loader mounted on a tractor.
Figure 3:
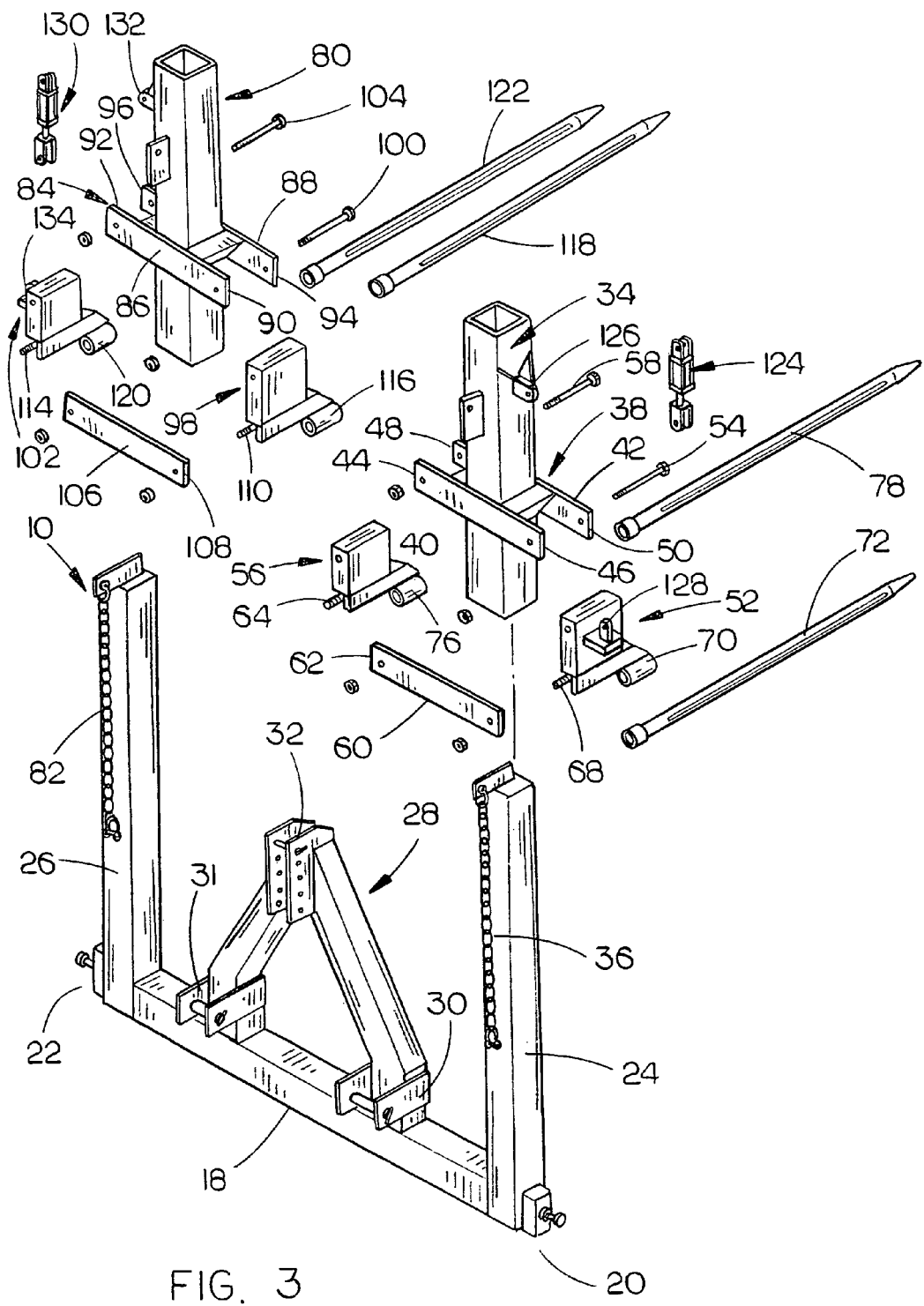
FIG. 3 is an exploded perspective view of the bale mover of this invention.
Figure 4:
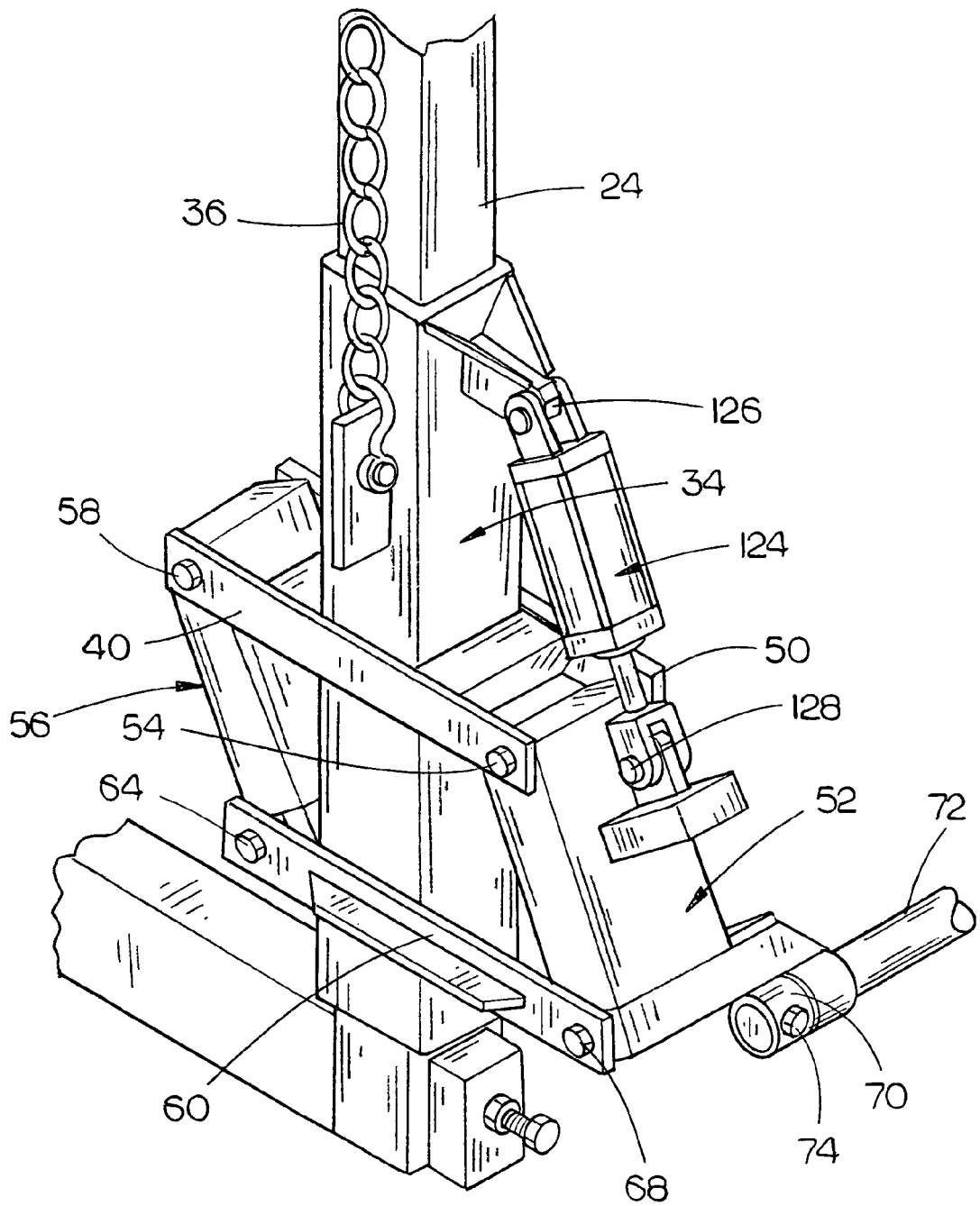
FIG. 4 is a partial perspective view of one end of the bale movers of FIG. 3.
Figure 5:
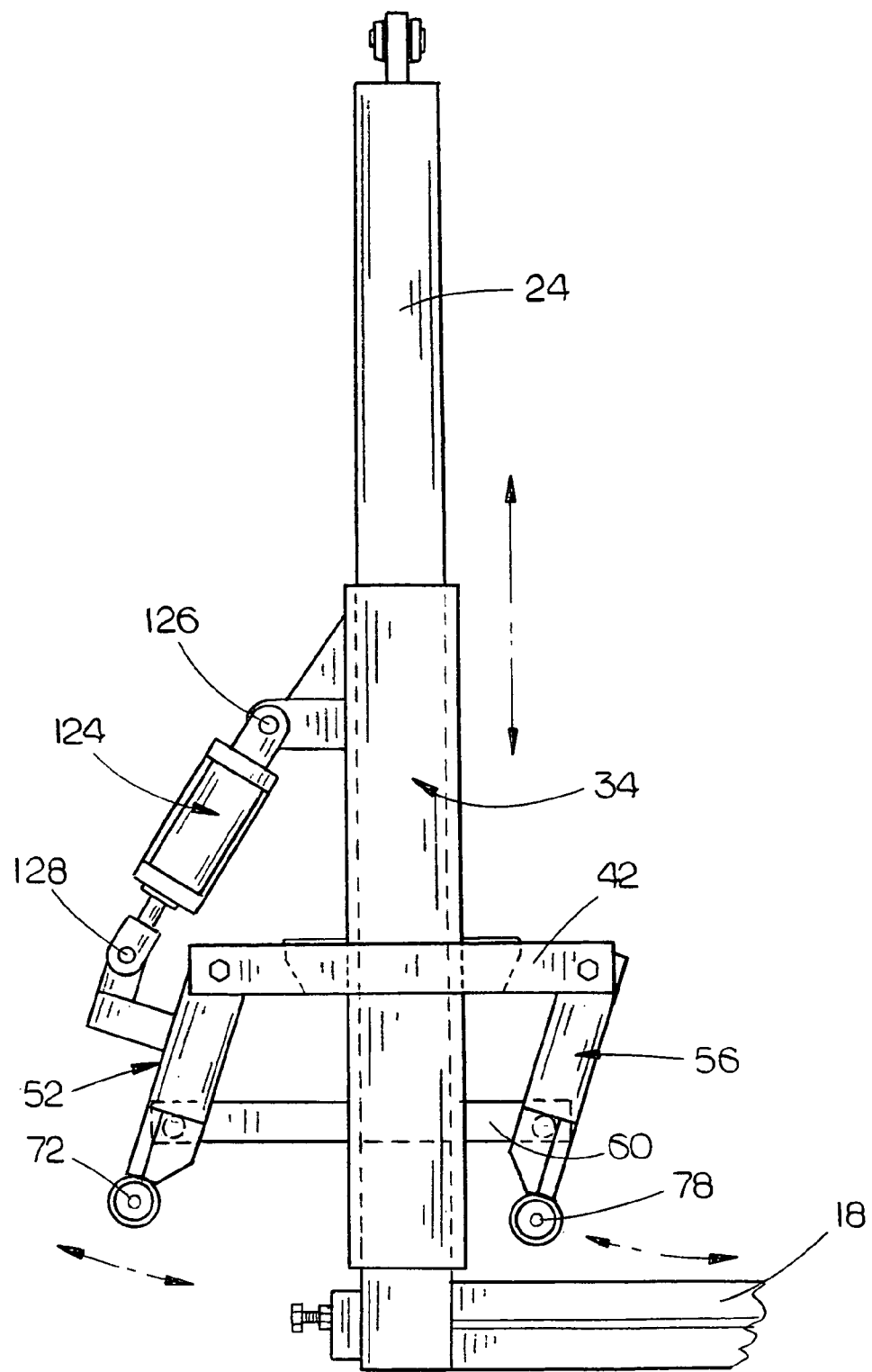
FIG. 5 is a side elevational view of one end of the bale mover of this invention.

The round bale mover of this invention is referred to by the reference numeral 10 which is adapted to be mounted on the forward end of a front-end loader 12 which includes a pair of conventional boom arms 14, each of which is raised or lowered by a hydraulic cylinder 16, or mounted on a three-point hitch 17 at the rearward end of a tractor.

Bale mover 10 will be described as if it is mounted on the forward end of the front-end loader mounted on a tractor. Bale mover 10 includes an elongated, horizontally extending main frame 18 having ends 20 and 22. An upstanding first post 24 is secured to end 20 of main frame 18 and extends upwardly therefrom. An upstanding second post 26 is secured to end 22 of main frame 18 and extends upwardly therefrom. An upstanding central framework 28 is secured to main frame 10 between ends 20 and 22 thereof and is provided with attachment assemblies 30, 31 and 32 at its back side which are adapted to be connected to the forward ends of the boom arms 14 or to the three-point hitch 17 at the rearward end of the tractor.

A first tubular support 34 is vertically slidably mounted on post 24. As seen, the upper end of tubular support 34 dwells in a plane below the upper end of post 24. In this embodiment, one end of a first flexible tether 36 is secured to the upper end of post 24 with the other end of tether 36 being secured to tubular support 34.

A first generally horizontally disposed support frame 38 is welded to tubular support 34 above the lower end thereof and which includes a support member 40 positioned at the rearward side of tubular support 34 and a support member 42 positioned at the forward side of tubular support 34. Support member 40 will be described as having an inner end 44 and an outer end 46. Support member 42 will be described as having an inner end 48 and an outer end 50.

A first link 52 has its upper end pivotally secured to the outer ends of 46 and 50 of support members 40 and 42 respectively by a pivot bolt 54. A second link 56 has its upper end pivotally secured to the inner ends 44 and 48 of support members 40 and 42 respectively by pivot bolt 58. The numeral 60 refers to a first linkage member. The inner end 62 of linkage member 60 is pivotally secured to the lower end of link 56 by a bolt or pin 64. The outer end 66 of linkage member 60 is pivotally secured to the lower end of link 52 by a bolt or pin 68.

A forwardly extending collar or sleeve 70 is welded or otherwise secured to the lower forward end of link 52 which receives the rearward end of a first bale tooth or spear 72 therein. Tooth 72 is maintained in collar 70 by set screw or bolt 74. A forwardly extending collar or sleeve 76 is welded or otherwise secured to the lower forward end of link 56 which receives the rearward end of a second bale tooth or spear 78. Tooth 72 is maintained in collar 76 by a pin or bolt identical to set screw or bolt 74.

A second tubular support 80 vertically slidably embraces post 26. As seen, the upper end of tubular support 80 dwells in a plane below the upper end of post 26. In this embodiment, one end of a second flexible tether 82 is secured to the upper end of post 26 with the other end of tether 82 being secured to tubular support 80. The effective length of one of the tether members is less than the effective length of the other tether members as disclosed in U.S. Pat. No. 7,753,636.

A second generally horizontally disposed support frame 84 is welded to tubular support 80 above the lower end thereof and includes a support member 86 positioned at the rearward side of tubular member 80 and a support member 88 positioned at the forward side of tubular support 80. Support member 86 will be described as having an inner end 90 and an outer end 92. Support member 86 will be described as having an inner end 94 and an outer end 96.

A third link 98 has its upper end pivotally secured to the inner ends 90 and 94 of support members 86 and 88 respectively by a pivot bolt 100. A fourth link 102 has its upper end pivoted to the outer ends 92 and 96 of support members 86 and 88 by pivot bolt 104.

The numeral 106 refers to a second linkage member. The inner end 108 of linkage member 106 is pivotally secured to the lower end of link 98 by bolt or pin 110. The outer end 112 of linkage member 96 is pivotally secured to the lower end of link 108 by bolt or pin 114. A forwardly extending collar or sleeve 116 is welded or otherwise secured to the lower forward end of link 98 which receives the rearward end of a third bale tooth or spear 118 therein. Tooth 118 is maintained in collar 116 by a set screw or bolt. A forwardly extending collar or sleeve 120 is welded or otherwise secured to the lower forward end of link 102 which receives the rearward end of a fourth bale tooth or spear 122. Tooth 122 is maintained in collar 120 by a set screw of bolt.

A hydraulic cylinder 124 has its base end pivotally secured to tubular support 34 at 126 and has its rod end pivotally secured to link 52 at 128. A hydraulic cylinder 130 has its base end pivotally secured to tubular support 80 at 132 and has its rod end pivotally secured to link 102 at 134.

Figure 6:
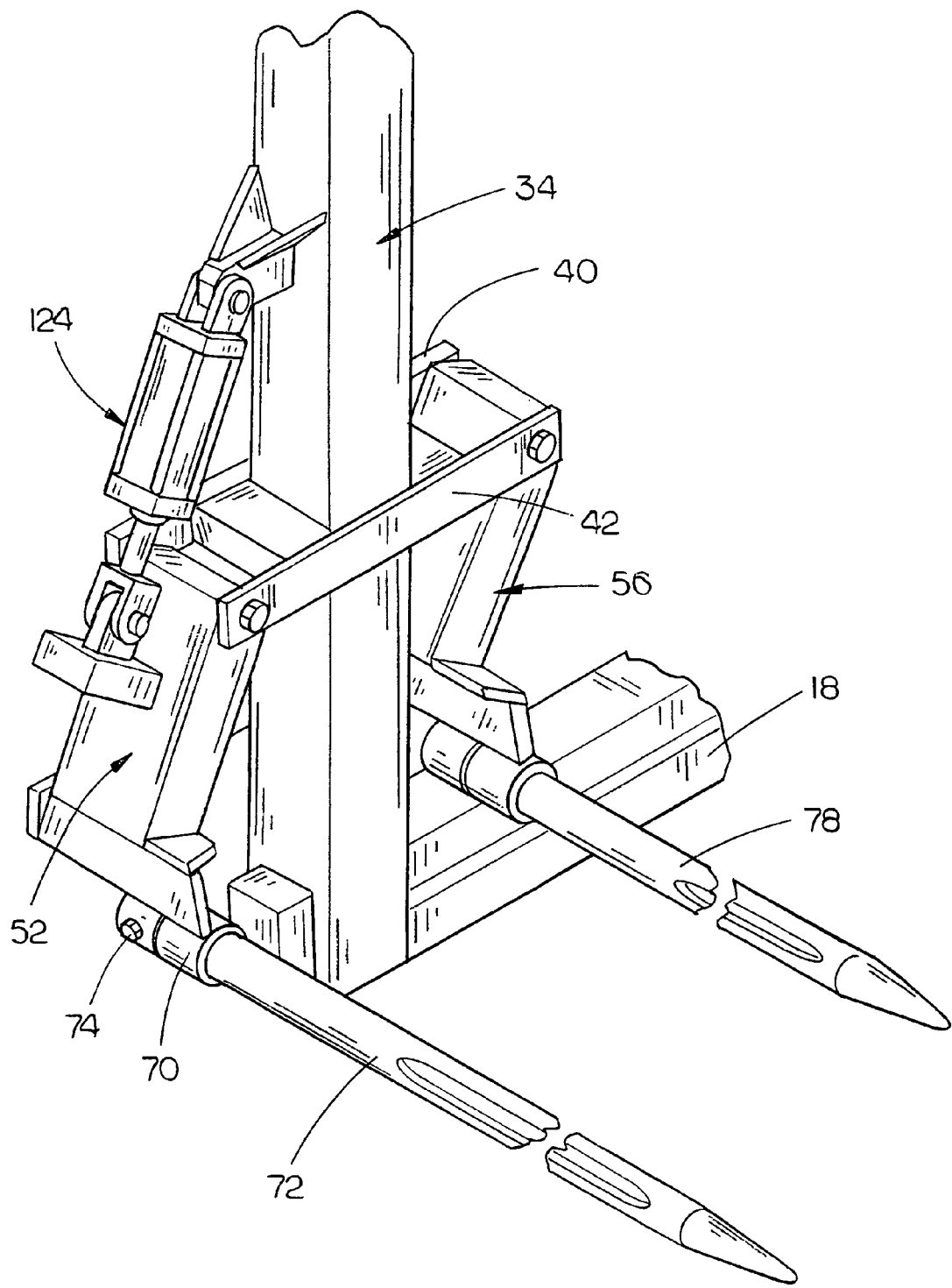
FIG. 6 is a partial front perspective view of one end of a further embodiment of the bale mover of this invention.

FIG. 6 illustrates a further embodiment of this invention. In this embodiment, the tubular supports 34 and 80 are not utilized. The base ends of the hydraulic cylinders 124 and 130 are pivotally secured to the posts 24 and 26 respectively.

Figure 7:
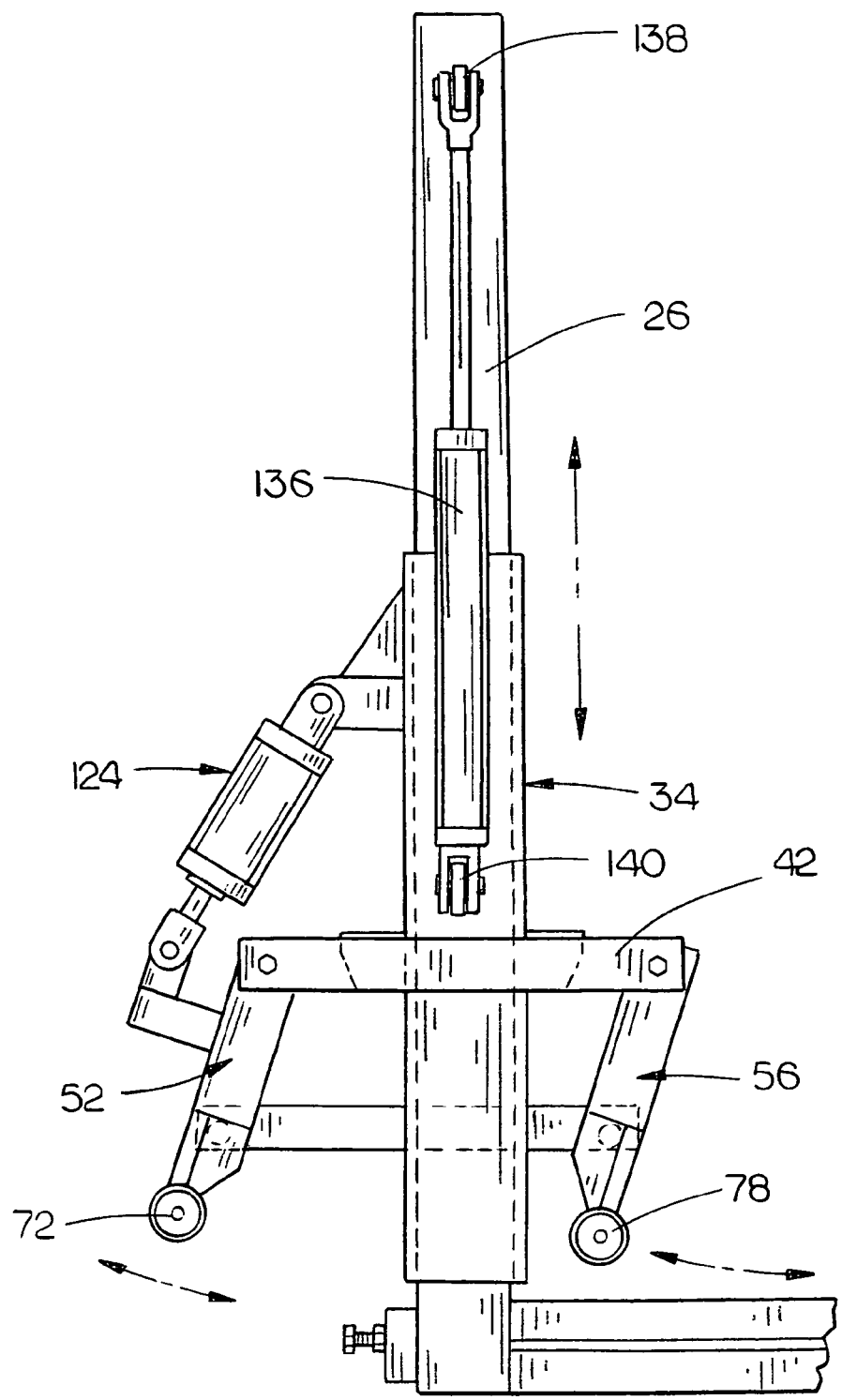
FIG. 7 is a side view of one end of a further embodiment of the invention wherein hydraulic cylinders are used to raise and lower the tubular supports with respect to their associated post.

FIG. 7 illustrates a further embodiment of this invention wherein hydraulic cylinders are used to raise and lower the tubular supports as illustrated in Applicant's earlier patent. Each of the posts 24 and 26 have the rod end of a hydraulic cylinder 136 secured thereto at 138 with the base end of the cylinder 136 secured to the tubular support at 140 to replace the tether members.

The bale mover of this invention enables a bale to be speared by the bale teeth 72 and 78 and a bale to be speared by the bale teeth 118 and 122 and transported to another location. If the bales are to be placed on the ground, the hydraulic cylinders 124 and 130 will be retracted so that the bale teeth will be moved laterally outwardly with respect to one another so that the bales, when placed on the ground, will be separated from one another to prevent the collection of snow or rain therebetween. If the bales are to be placed on a bale carrier, the hydraulic cylinders 124 and 130 will be extended to move the bales towards one another until they are in an abutting side-to-side relationship to reduce the width of the pair of bales for transport.

Although the invention has been described as being well suited for use with a front-end loader mounted on a tractor, the bale mover may be mounted on the forward ends of the boom arms of a payloader or telehandler.

It can therefore be seen that the invention accomplishes all of the stated objectives.

The invention claimed is:

1. A round bale mover for attachment to a vertically movable structure mounted on a tractor, with the tractor having forward and rearward ends, comprising:

an elongated transversely and horizontally extending main frame having first and second ends;
an upstanding attachment frame means secured to said main frame between the ends thereof adapted to be operatively selectively secured to the front-end loader;
first and second upstanding posts having upper and lower ends, a first side, a second side, an inner side and an outer side;
said lower end of said first post being secured to said first end of said main frame;
said lower end of said second post being secured to said second end of said main frame;
first and second tubular supports vertically slidably mounted on said first and second posts respectively which have a first side, a second side and inner and outer sides;
said first and second tubular supports being movable between upper and lower positions with respect to said first and second posts respectively;
a first generally horizontally disposed support frame secured to said first tubular support above said lower end thereof and which has an inner end positioned inwardly of said inner side of said first tubular support and an outer end positioned outwardly of said outer side of said first tubular support;
an elongated first link having upper and lower ends;
said upper end of said first link being pivotally secured, about a horizontal axis to said outer end of said first support frame;
an elongated second link having upper and lower ends;
said upper end of said second link being pivotally secured, about a horizontal axis, to said inner end of said first support frame;
an elongated first linkage member having inner and outer ends;
said outer end of said first linkage, member being pivotally secured, about a horizontal axis, to said lower end of said first link;
said inner end of said first linkage member being pivotally secured, about a horizontal axis, to said lower end of said second link;
a first elongated bale tooth operatively secured to said first link which extends horizontally therefrom;
a second elongated bale tooth operatively secured to said second link which extends horizontally therefrom;
as first hydraulic cylinder having a base end and a rod end;
said first hydraulic cylinder being movable between retracted and extended positions;
said base end of said first hydraulic cylinder being pivotally secured to said first tubular support above said first support frame;
said rod end of said first hydraulic cylinder being pivotally secured to said first link;
the retraction of said first hydraulic cylinder causing said first and second bale teeth to be moved laterally outwardly with respect, to said main frame;
the extension of said first hydraulic cylinder causing said first and second hate teeth to be moved late-rally inwardly with respect to said main frame;
a second generally horizontally disposed support frame secured to said second tubular support above said lower end thereof and which has an inner end positioned inwardly of said inner side of said second tubular support and an outer end positioned outwardly of said outer side of said second tubular support;
a third link having upper and lower ends;

said upper end of said third link being pivotally secured, about a horizontal axis, to said inner end of said second support frame;
a fourth link having upper and lower ends;
said upper end of said fourth link being pivotally secured, about a horizontal axis, to said outer end of said second support frame;
an elongated second linkage member having inner and outer ends;
said outer end of said second linkage member being pivotally secured, about a horizontal axis, to said lower end of said fourth link;
said inner end of said second linkage member being pivotally secured, about a horizontal axis, to said lower end of said third link;
a third elongated bale tooth operatively secured to said third link which extends horizontally therefrom;
a fourth elongated bale tooth operatively secured to said fourth link which extends horizontally therefrom;
a second hydraulic cylinder having a base end and a rod end;
said second hydraulic cylinder being movable between retracted and extended positions;
said base end of said second hydraulic cylinder being pivotally secured to said second tubular support above said second support frame;
said rod end of said second hydraulic cylinder being pivotally secured to said fourth link;
the retraction of said second hydraulic cylinder causing said third and fourth bale teeth to be moved laterally outwardly with respect to said main frame;
the extension of said second hydraulic cylinder causing said third and fourth bale teeth to be moved laterally inwardly with respect to said main frame;
first and second elongated tether members hay no upper and lower ends;
said upper end of said first tether member being secured to said first post adjacent the upper end thereof;
said lower end of said first tether member being secured to said first tubular support to limit the downward movement of said first tubular support with respect to said first post;
said upper end of said second tether member being secured to said second post adjacent the upper end thereof;
said lower end of said second tether member being secured to said second tubular support to limit the downward movement of said second tubular support with respect to said second post;
the effective length of one of said tether members being longer than the effective length of the other tether member so that the tubular support connected to the shorter tether member will be positioned in a plane above the other tubular support so that the bale teeth secured to that tubular support will be in a plane above the bale teeth secured to the other tubular support.

2. The round bale mover of claim 1 wherein the vertically movable structure comprises a front-end loader mounted on the forward end of the tractor and wherein said first, second, third and fourth bale teeth extend forwardly from said first, second; third and fourth links respectively.

3. The round bale mover of claim 1 wherein the vertically movable structure comprises a three-point hitch mounted on the rearward end of the tractor and wherein said first, second, third and fourth bale teeth extend rearwardly from said first, second, third and fourth links respectively.

* * * * *